Sept. 22, 1970     F. R. MORGENTHALER     3,530,302
METHOD OF AND APPARATUS FOR CHANGING FREQUENCY POWER
AND/OR DELAY TIME OF WAVE ENERGY
Filed June 14, 1967

FREDERIC R. MORGENTHALER
INVENTOR
BY
ATTORNEY

FREDERIC R. MORGENTHALER
INVENTOR
BY
ATTORNEY

United States Patent Office 3,530,302
Patented Sept. 22, 1970

3,530,302
METHOD OF AND APPARATUS FOR CHANGING FREQUENCY POWER AND/OR DELAY TIME OF WAVE ENERGY
Frederic R. Morgenthaler, Winchester, Mass., assignor to Massachusetts Institute of Technology, Cambridge, Mass., a corporation of Massachusetts
Filed June 14, 1967, Ser. No. 645,947
Int. Cl. H03f 7/00
U.S. Cl. 307—88.3                                        14 Claims

ABSTRACT OF THE DISCLOSURE

A method of varying frequency and power of wave energy by introducing the wave energy into a material, said material being one which supports propagating wave energy of which the phase velocity and/or group velocity can be varied by varying the environmental parameters within the material, controlling said parameters to ensure that at least a part of the energy takes the form of a wave of which the phase velocity and/or group velocity can be varied, and, during the time that the energy is in such form, changing said parameters in time thereby to vary the frequency and power of the wave. The method is useful, also, to vary the period of time that the wave is in the material thereby to provide a variable delay line for wave energy, and to vary the duration of a wave pulse in order to effect pulse compression or expansion.

---

The invention herein described was made in the course of contracts with the Office of the Secretary of Defense, Advanced Research Projects Agency and Air Force Cambridge Research Laboratories, Office of Aerospace Research.

Magnetostrictive materials have been used as delay lines wherein, for example, an electromagnetic signal introduced at one end of the material travels or propagates across the material to be removed at the other end at the input frequency but with a delay in time. See an article entitled "Generation of Spin Waves in Nonuniform Magnetic Fields, with Application to Magnetic Delay Lines," Schlömann et al., Proceedings of the I.E.E.E., vol. 53, No. 10, pages 1495 et seq. It is noted in the Schlömann et al. article that the electromagnetic waves may be coupled to spin waves in the material by the use of an appropriately valued DC magnetic bias field having a suitable spatial gradient along the path of the travel of the wave. The spatially nonuniform time invariant bias field, as disclosed in the Schlömann et al. article, is discussed briefly in an article entitled "Phase-Velocity-Modulated Magnetoelastic Waves," by Frederic R. Morgenthaler, the present inventor, published in the Journal of Applied Physics, vol. 37, No. 8, July 1966, pages 3326–3327. It is noted in both articles that the wave energy may travel in the material as a spin wave (magnon), but that the wave may convert to an elastic wave (phonon) when proper conditions exist, the conversion from magnon-to-phonon at any particular frequency being a function of the magnitude of the bias field and the field gradient. The power propagating within the material at any particular instant of time may appear as electromagnetic, elastic or exchange power, or as combinations thereof. It is possible by proper choice of frequencies and magnetic biasing to have an electromagnetic, acoustic or spin-wave input and to obtain an electromagnetic, acoustic, or spin-wave output. Furthermore, there may be photon-to-magnon-to-phonon, or phonon-to-magnon-to-photon conversion, or variations thereof, depending upon the strength of the biasing magnetic field and the frequency of the introduced wave. However, in linear operation the output frequency will be equal to the input frequency, and, in addition, no amplification of wave energy takes place.

It is an object of the present invention, accordingly, to provide means for obtaining the before-mentioned conversion interchangeably from photon-to-magnon-to-phonon, but with a change in frequency; and to provide, further, for amplification of the input signal in those instances when the frequency is increased.

It is a further object to provide variable delay of the signal by controlling the length of time that the signal appears in the magnon and phonon forms.

Still another object is to provide apparatus adapted to change the frequency and power of wave energy and, in addition, to change the character of the wave energy, as from magnon-to-phonon, even in the absence of the bias field gradient required in prior art devices, by changing the bias field in time.

While the invention is explained primarily in connection with waves that may be characterized by the term "magnon," the disclosure relates broadly to propagating waves whose phase velocity and/or group velocity may be varied and to materials which support such waves and that have environmental parameters which may be varied to effect variation of the velocities; it is, therefore, a still further object to provide a method and apparatus for varying the frequency, power, pulse duration and/or delay time of a wave by a variation of the phase velocity and/or group velocity of the wave energy.

Other objects will be evident in the explanation to follow and be particularly pointed out in the appended claims.

By way of summary, the objects of the invention are attained, broadly, by a method of changing frequency, power, and delay time of wave energy that comprises, introducing the energy to a material as, for example, a suitably doped yttrium-iron-garnet rod, having variable environmental parameters relative to passage of the wave energy therethrough, said material being one which supports at least one form of propagating wave energy in which at least one of the phase velocity and group velocity can be varied by said parameters, controlling the parameters during said passage to ensure that the energy appears as a wave of which at least one of the phase velocity and group velocity can be varied during at least a portion of the time that the wave is in the material, and varying the said parameters during the time that the wave is in the material.

The invention will now be described in connection with the appended drawings, in which, FIG. 1 is a schematic diagram of apparatus that may be used to practice the invention;

Figure 1:
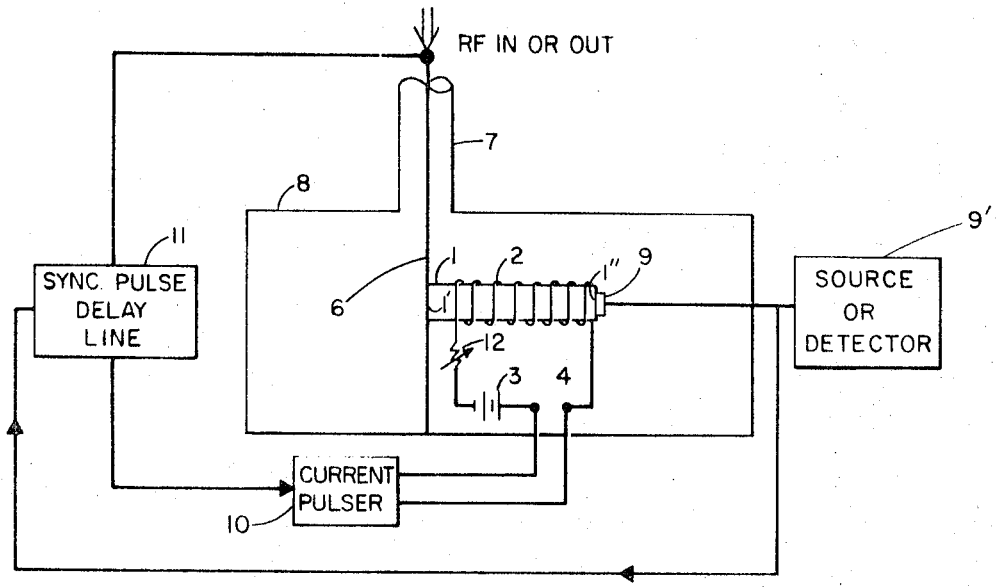
FIG. 1A is a block diagram of a modification of the apparatus shown schematically in FIG. 1.
Figure 2A:
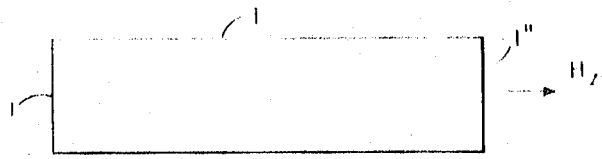
FIG. 2A is a side view of a magnetostrictive rod that may be used in the apparatus of FIGS. 1 and 1A.
Figure 2B:
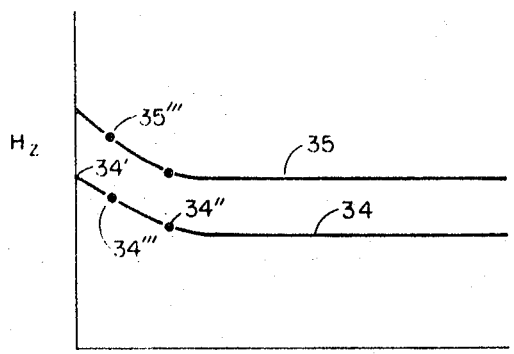
Figure 2C:
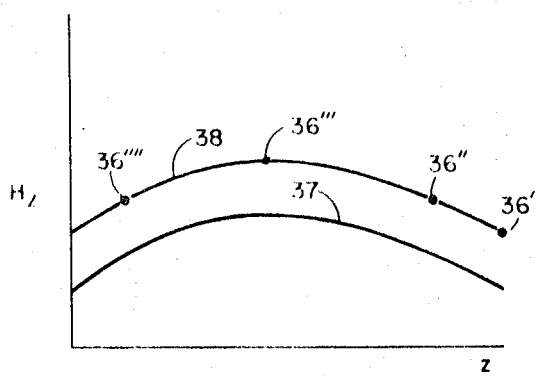
Figure 2D:
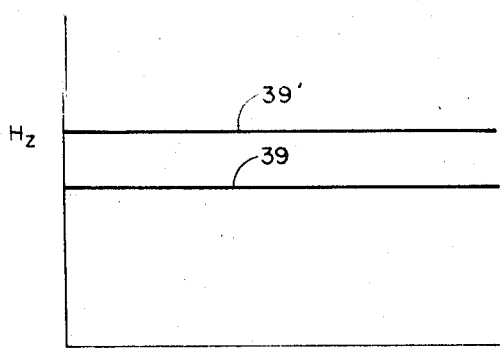
Figure 3A:
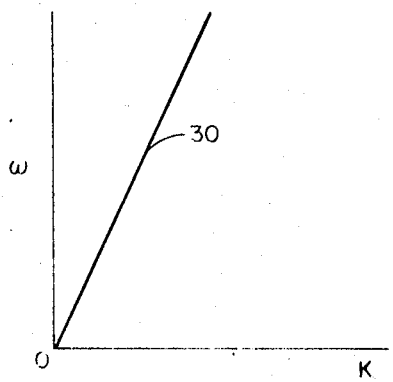
Figure 3B:
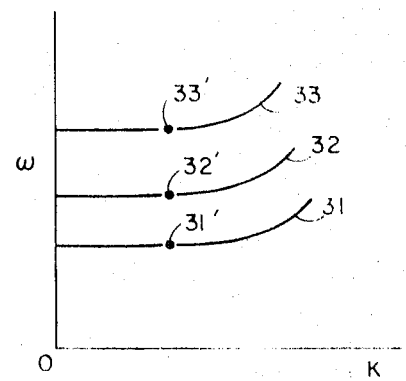
Figure 3C:
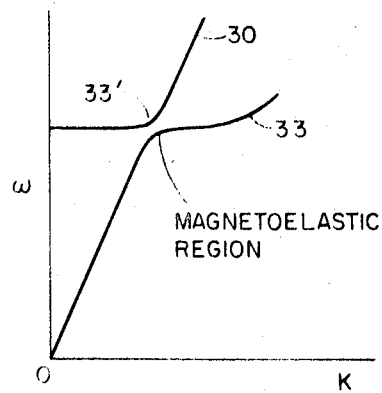
Figure 3D:
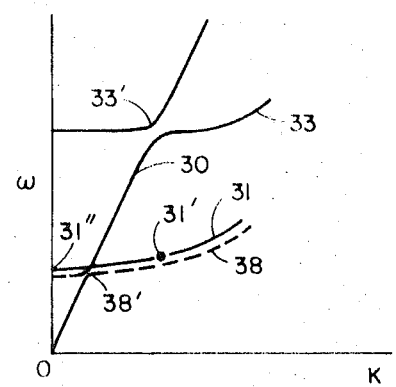
Figure 4:
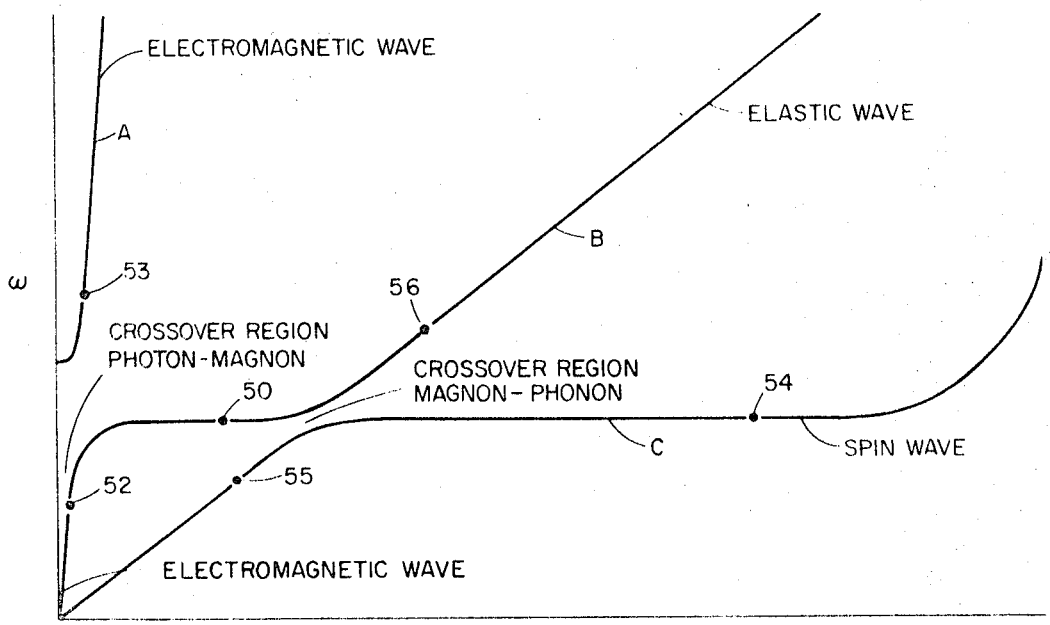
Figure 5:
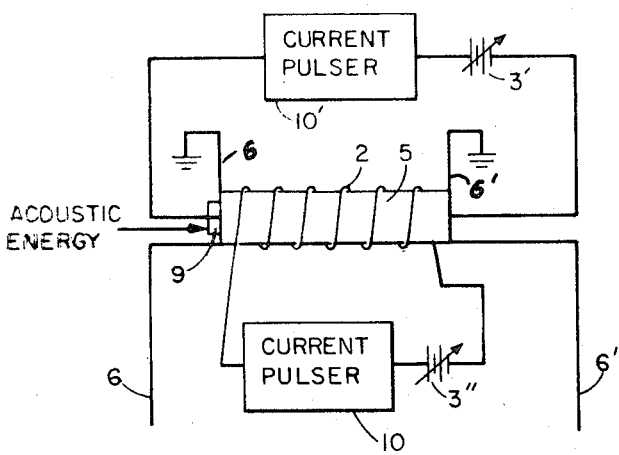

FIGS. 2B, 2C and 2D each represents, graphically, a profile of a magnetic bias field within the rod in FIG. 2A, the representations being the magnitude of the field at each point axially along the rod from the left side to the right side thereof at two levels of magnetizing bias;

FIG. 3A is a sketch representing the relationship between the angular frequency ($\omega$) of an elastic wave (phonon) and the wave number ($k$) in a given material;

FIG. 3B is a sketch representing the relationship between the angular frequency ($\omega$) of a spin wave (magnon) and the wave number ($k$) in the same material represented in FIG. 3A, the environmental parameters in the material being changed in time to effect the shifts of the $\omega$ vs. $k$ curves from, for example, the lowermost curve to the intermediate curve to the uppermost curve;

FIG. 3C is a sketch representing the relationship between the angular frequency ($\omega$) and the wave number ($k$) of the elastic wave represented in FIG. 3A and the uppermost spin wave represented in FIG. 3B, particularly to show the waves at the magnetoelastic or crossover region at which energy can be transferred from one wave to the other;

FIG. 3D is a sketch that is similar to the sketch in FIG. 3C except that two magnetoelastic regions are shown to represent two crossover regions for energy transfer from elastic to spin waves or vice versa as functions of a time varying and/or space varying magnetic field;

FIG. 4 is a sketch representing $\omega$–$k$ values for positive-circularly-polarized waves propagating parallel to the magnetic bias field and is similar to the sketches in FIGS. 3A–3D except that FIG. 4 is an expanded representation to show electromagnetic wave values which in the contracted representations of FIGS. 3A–3D lie immediately adjacent the ordinate;

FIG. 5 is a modification of the apparatus shown in FIG. 1; and

Figure 6:
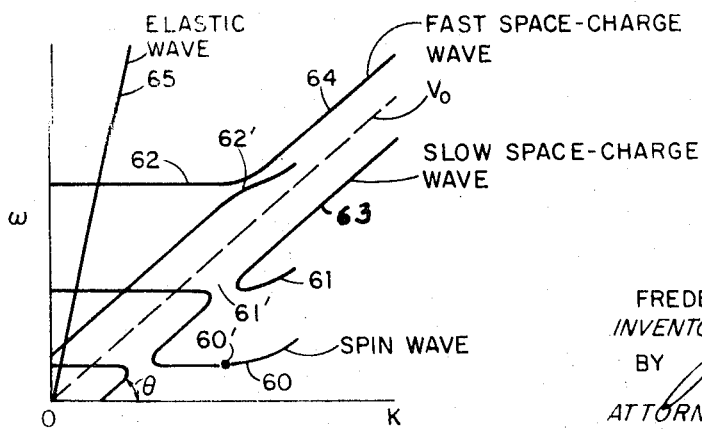

FIG. 6 is a sketch representing the relationship between the angular frequency ($\omega$) and the wave number ($k$) of elastic waves, space-charge waves, and spin waves in a semiconductor magnetostrictive material.

Prior to a detailed discussion of the present invention, it is in order to discuss, briefly, the overall theory upon which the disclosure is based. As previously mentioned, delay lines have been devised of magnetostrictive material to effect a delay of, for example, an electromagnetic signal (photon) at microwave frequencies by passing the signal through the magnetostrictive material. In such delay lines the energy may pass through the material as a photon, which may be impractical because of the very short delay time possible in reasonably-sized devices and/or large attenuation of photon energy, or conversion to a spin wave (magnon) may occur under appropriate conditions. The rate of travel of the magnon is quite slow so that appreciable delay occurs, but magnon losses and pulse dispersion are quite great. It has been proposed, therefore, to convert the magnon to an elastic wave (phonon), which is not so lossy, and to pass the phonon through the material. Conversion from photon-to-magnon-to-phonon and vice versa is effected in a magnetostrictive material by the use of an appropriately valued DC bias magnetic field with a proper gradient along the path of travel in the material. The DC bias field may be adjusted to any particular level, but once established at that level, it is thereafter invariant in time. The magnons passing through the graded field experience changes in wave number ($k$) and group velocity, but no change in the angular frequency ($\omega$) occurs. In the Morgenthaler article the bias field above discussed is termed a "spatially non-uniform time-invariant magnetic field." The Morgenthaler article refers also to a "time varying . . . magnetic field" and it is to this latter type field that the present invention is primarily directed. As will become clear hereinafter, whether the field does or does not also contain a space gradient is not, in and of itself, important, even though the space gradient may be used, if available.

The present invention then, uses a time varying magnetic bias field to effect conversion from magnon-to-phonon. It is useful primarily in connection with pulsed energy, the wave length of the magnons and phonons of which is short compared to the dimension of the material within which the energy is to travel or propagate in the direction of travel. And, as will be evident in the discussion to follow, the magnon energy is moved up or down by time variations of the bias field, thereby changing the angular frequency of the spin wave, but not the wave number. It will be seen, therefore, that the time varying field results in constant $k$ conversion but with variable $\omega$. Since the power of the spin wave is proportional to the angular frequency and the group velocity thereof, the power of the magnon may be raised or lowered by changing the magnetic bias field in time. The magnetic bias field is raised or lowered in the illustrated embodiment by pulsing an applied field. The magnetic bias field contains a DC component which may be spatially uniform or have a gradient, and the pulsing has the effect of raising or lowering the field from the DC level. The bias field, in order to accomplish the desired results, is pulsed during the time that the wave energy is in the material, and during the time that the energy appears as a spin wave if the frequency and power level are to be affected—although crossover may be accomplished if the field is pulsed even during the time period at which phonons alone exist.

Figure 1A:
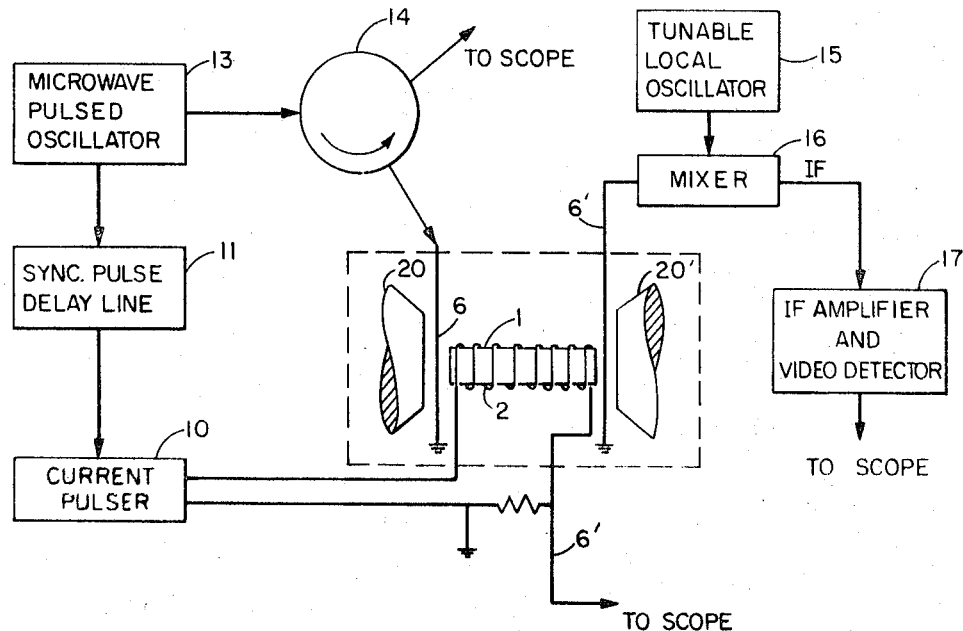

Referring now to FIG. 1, apparatus is shown, in schematic form, which is adapted to change the frequency, power and/or delay time of wave energy. The wave energy may be introduced as an electromagnetic wave (photon) through the center conductor 6 of a coaxial cable 7 to a material 1 (in a cavity 8) at one end 1' thereof. The material 1 must be one which supports at least one form of a propagating wave whose phase velocity and/or group velocity can be varied by varying the environmental parameters of said material; one such wave is a spin wave (magnon). In a preferred embodiment of the invention the said material, as shown in FIGS. 1 and 1A, consists of a doped yttrium-iron-garnet (YIG) rod, the environmental parameters being a magnetic bias field $H_z$. The field $H_z$ is induced in the said rod by a coil 2, energized by a battery 3, adjustable to some predetermined level by a variable resistance 12, the current being thereafter pulsed by a current pulser 10, thereby to change the said $H_z$ in time.

By proper choice of the initial magnetic bias field $H_z$ for a particular photon frequency, it is possible to convert the photon to a magnon within the rod 1, as explained in the Schlomann et al. article. Let it be assumed that the appropriate value of bias field $H_z$ is that shown along the curve 39 in FIG. 2D and that the bias field in the $z$ direction, subsequent to conversion, is uniform as shown. Assume, further, that the angular frequency ($\omega$) and wave number ($k$) for the particular spin wave initially are represented by the curve 31 in FIG. 3B. A photon introduced at the end 1' may, for example, convert to a magnon having the $\omega$–$k$ values shown at 31', and the spin wave will travel or propagate along the rod 1 from the end 1' toward the other end 1" at constant $k$ and $\omega$. The $\omega$–$k$ curve for the elastic wave (phonon) of the rod 1 may be that shown at 30 in FIGS. 3A, 3C and 3D. It can be seen, with reference to FIG. 3D, that no conversion of energy from magnon-to-phonon will take place since, as will be explained more fully hereinafter, the $\omega$–$k$ of the magnon is not within what may be termed the magnetoelastic or crossover region of the diagram. The bias field $H_z$ may be increased to some value 39' by a pulse from the current pulser 10 to shift the spin wave $\omega$–$k$ curves upward continuously from the curve 31 to the curve 32 to the curve 33 and beyond, the particular values of $\omega$ and $k$ for the particular spin wave being 31', 32' and 33', respectively. As the spin wave passes through the magnetoelastic or crossover region designated 33' in FIGS. 3C and 3D, assuming passage therethrough at an appropriate rate, a transfer of energy will take place converting magnon energy to phonon energy. Since, as has been stated, the $\omega$–$k$ curve for the magnon is now beyond the magneto-elastic region 33' and since the field bias $H_z$ is uniform along the rod 1, no reconversion from phonon-to-magnon will take place (unless, of course, the field bias $H_z$ is lowered back through the magnetoelastic region 33'). The phonon will, therefore, travel back and forth along the rod 1 until attenuated or removed by the transducer shown at 9 in FIG. 1.

In the discussion just made, the magnon angular frequency was increased from the value 31' to the value 33', but no change in wave number occurred because the bias field $H_z$ remained constant or uniform in space throughout the appropriate length $z$ of the rod 1—the effect of spatial variation of bias field $H_z$ on a magnon will be explained in detail hereinafter. Since the value $\omega$ of each magnon at the angular frequency shown at 33′ is greater than $\omega$ at the value 31′ and since the number of magnons did not change (neglecting attenuation), the power of the spin wave, as well as the frequency, was increased, the increase in power being extracted from the pulsed field $H_z$. Since the frequency of the wave just prior to conversion is essentially the same as just after, there is no appreciable change in the total energy contained by the wave pulse; however, after conversion the group velocity can vary markedly since the time duration of the pulse and hence its instantaneous power changes; for example, the group velocity increases when a spin wave converts to an elastic wave, and the instantaneous power increases markedly. Should the magnon have been introduced at some value of $\omega-k$ above the value 33′ and then lowered toward the magnetoelastic region 33′, the power and frequency of the magnon would have been lowered.

As was previously mentioned, if the magnon $\omega-k$ values are raised above the magnetoelastic region, so that reconversion from phonon-to-magnon is not possible, the wave energy will remain as a phonon within the rod. It may be useful to use this phenomenon to produce very high frequency phonons within a material where such energy is not attainable with acoustic devices now available. Furthermore, it is possible using the method herein disclosed to introduce a photon, convert the photon to a magnon very soon thereafter, convert the magnon to a photon and allow the phonon to travel in the rod for some predetermined time before reconversion to magnon-to-photon, thereby to create a variable delay line.

Assume now that the appropriate magnetic bias, as established by the coil 2, at the end 1′, has the value shown at 34′ on the curve 34 of FIG. 2B, so that a spin wave is created at or near the end 1′ traveling toward the other end 1″ of the rod. Assume further that the $\omega-k$ curve of the wave is again that shown along 31 in FIGS. 3B and 3D and that the values of $\omega$ and $k$ of the spin wave at the end 1′ are at 31″. Experience has shown that as the spin wave travels along the rod 1 from an area of one level of magnetic bias in the direction of decreasing magnetic bias in a spatially nonuniform, time invariant magnetic bias field, the angular frequency ($\omega$) of the wave remains constant, but the wave number ($k$) increases in value. Since the $\omega-k$ of the spin wave at 31″ is not coincident with the $\omega-k$ of the elastic wave, shown by the line 30, no exchange of energy will take place. Now, however, as the spin wave travels along the rod 1 in the direction of decreasing magnetic field the $\omega-k$ curve of the spin wave moves from the curve 31 continuously with spatially changing field bias $H_z$ to the curve shown in dotted lines at 38 and at 38′, an exchange of energy takes place between the spin wave and the elastic wave represented by the curve 30. Assume that complete conversion takes place at that point, which can be at the field bias value 34″ in FIG. 2B. The elastic wave, which is unaffected by further changes in the magnetic bias field, will travel toward the other end 1″ of the rod and at 1″ may be removed in whole or in part by the transducer 9 or may be reflected toward the end 1′, changing again to a spin wave at 34″, and some or all of the spin wave energy can be removed by the center conductor 6 at the input frequency. The discussion just made describes the function of a typical ferrite rod as may be used for delay line purposes with no changes in frequency or delay time.

The present invention, however, contemplates action upon the spin wave within the rod 1 to effect changes thereupon in frequency, power and/or delay time, as previously discussed. Assume again that a photon is introduced to the rod at 1′ and that the bias magnetic field $H_z$ again is at the value shown at 34′. Assume further that a magnon having the $\omega-k$ value shown at 31′ in FIGS. 3B and 3D appears within the rod at some value of magnetic field 34‴ in FIG. 2B. Now, however, instead of allowing the magnon to move along the rod 1 with the magnetic bias represented by the profile 34, the magnetic bias field $H_z$ is pulsed to some higher value, that may be that represented by the curve 35, by the use of the current pulser 10 in FIG. 1. The increase in the magnetic bias field $H_z$ results in an increase in the $\omega$ of the spin wave, as before discussed, but now with some change in $k$ values, since the change in field bias $H_z$ cannot be instantaneous; so the values of $\omega-k$ will be slightly to the right of 32′ and 33′ and the crossover region will be above 33′. This change in the magnetic bias field by pulsing in herein termed a time change to distinguish over the spatial change previously discussed. At the crossover region some or all of the energy in the spin wave is converted to an elastic wave. Thereafter the elastic wave travels toward the other end 1″ to be removed (at an increased frequency) or is reflected in the manner previously discussed. If all or any part of the elastic wave is reflected toward the end 1′ and if, further, the new value of magnetic bias $H_z$ is maintained, the wave will re-convert to a spin wave at the field value shown at or near 35‴ and be removed again by the center conductor 6, as previously, but this time at an increase in frequency over the input frequency and at an increase in power, disregarding losses in conversion and attenuation within the rod.

In FIG. 2C a different profile of bias field $H_z$ is shown for the rod 1 in FIG. 2A at two values of magnetic bias. Assume that an elastic wave is introduced by the acoustic transducer 9 at the bias field value shown at 36′ on the curve shown at 38. Assume, further, that the crossover field value is that shown at 36″. The elastic wave will convert to a spin wave at the value 36″ and propagate toward the end 1′ of the rod as a spin wave experiencing decreases in $k$ toward the value 36‴ and increases thereafter and will reconvert to an elastic wave at some value as that shown in 36⁗. If the field value at 36‴ is great enough, however, the rod 1 acts as a cutoff wave guide and the spin wave never traverses the full length, but is reflected at some point toward the other end 1″, being reconverted to an elastic wave at the value 36″. Furthermore, as before discussed, the field $H_z$ may be lowered to the curve 37 when the wave is in the spin wave form, with resulting decrease in wave frequency and power.

In FIG. 1 the acoustic transducer 9 is adapted to introduce elastic wave energy to the rod 1, or remove such energy from the rod, an electric signal being passed from or to a source or detector 9′. In like manner, electromagnetic energy may be introduced or removed through the coaxial cable 7. The energy introduced is in the form of pulses and both the acoustic transducer and the coaxial cable are connected to a variable sync pulse delay line 11 to enable changes in the field $H_z$ to be effected when the wave energy is at different axial positions along the rod 1.

A more elaborate system is shown in block diagram form in FIG. 1A where elements that perform the same function as the elements of FIG. 1 are numbered similarly to FIG. 1. In addition to the circuit elements already discussed, a microwave pulsed oscillator 13 is shown to provide an input pulse of electromagnetic microwave energy to a circulator 14 which in turn feeds the energy through the conductor 6 to the rod 1. Electromagnetic energy is removed from the rod by a coaxial cable 6′ which feeds a mixer 16 in which a local oscillation from a tunable local oscillator 15 is mixed with the signal from the rod 1 to provide an IF signal in turn is amplified and detected by an IF amplifier and video detector 17. The output of the amplifier and detector 17 is fed to an oscilloscope (not shown) where the waveform of the IF signal is displayed and compared with a signal from the circulator 14 and a further signal from the current pulser 10. The pulsed oscillator 13 also feeds a sync pulse to the variable delay line 11 to enable proper timing of the current pulse to the coil 2, the DC bias magnetic field in the apparatus of FIG. 2 being provided by two pole pieces 20 and 20′ having adjustable field values. Transmission of electromagnetic energy directly from the input at 6 to the output at 6' is prevented by a shield, not shown.

The photon energy introduced to the rod 1 may be in the microwave region and the $\omega$–$k$ values shown graphically in FIGS. 3B, 3C and 3D are typical of operation in that region when wave propagation is parallel to the bias field $H_z$—although waves propagating in other directions are available with other curvatures. Also, for the sake of simplicity, one curve is shown for the $\omega$–$k$ of the magnon for a particular value of field bias $H_z$; whereas, in fact, it is possible to have more than one value. For example, it is possible in some materials (as in the anti-ferromagnetically coupled material hereinafter discussed) and at some frequency of input signal to have dual $\omega$–$k$ curves vertically spaced; one might be that shown at 31 in FIG. 3B and the other at 32, to represent the $\omega$–$k$ values for counter-rotating spin waves. The spacing between the two curves can be varied by changing the field bias $H_z$. Also, coupling from magnon-to-phonon can be effected along either curve. Furthermore, it is possible to have an $\omega$–$k$ curve such as that shown at 31 in the microwave region and to have other curves displaced far above the curve 33 in the infrared region, although coupling at the latter $\omega$–$k$ values is quite difficult with presently available materials and techniques. Similarly, a number of different types of elastic waves may be propagated at different speeds in the rod 1 and the $\omega$–$k$ values for such waves, not necessarily straight line functions, will differ from the values shown at 30 in the drawing. Also the field bias $H_z$ in the material 1 need not be oriented parallel to the path along which the waves propagate and, in fact, need not be oriented in one direction throughout.

Reference has been made to a magnetoelastic or crossover region, which occurs at 33' and 38' under the conditions previously discussed. As the wave energy comes into the magnetoelastic region it takes on properties of both the elastic wave and the spin wave, irrespective of what properties existed just prior to entry into the region. If the environmental parameters, as seen by the wave, are held constant for some short period of time (either by stopping the time change or the space change) a complete exchange of energy will not take place. The resulting form of wave energy and power will be determined, then, by the direction in which the characteristics of the material are varied subsequent to the exchange period. Thus a spin wave or an elastic wave will exist in the material or rod 1 subsequent to the exchange at the magnetoelastic region depending upon whether the characteristics immediately subsequent to the exchange time favor a spin wave or an elastic wave, respectively. Furthermore, passage through magnetoelastic region either in space or time if effected at too rapid a rate will result in little or no energy exchange; so, for example, a magnon could pass through the magnetoelastic region too rapidly to allow anl conversion of its energy to a phonon even though under proper conditions such conversion could take place. The extent of the gap in the magnetoelastic region is determined by the magnetorestrictive constants, crystallographic orientation of the material of which the rod is made and the direction of field bias $H_z$ relative thereto.

A more general explanation of the forms of energy and the transfer of power will now be made, with particular reference to FIG. 4, wherein certain of the electromagnetic, elastic and spin waves are represented by the $\omega$–$k$ curves A, B and C, respectively. The energy may be introduced as an electromagnetic wave on the curve A and, by proper choice of field bias $H_z$, a transfer of energy may be made depending on the bias and material. While in the electromagnetic form, as below a point 52 and above a point 53 on the curve A, the power transfer is primarily elecromagnetic. Between the points 52 and 53 there may be a transfer to spin wave energy and now the power transfer is as electromagnetic and exchange power until an $\omega$–$k$ value is reached as that shown at 50, where for values to the right of 50 on the curve C exchange power dominates, to the exclusion of other power forms at some point 54 on the curve. Similarly, below point 55 and above point 56 on the $\omega$–$k$ curve B, elastic power dominates. And, of course, in the crossover regions, mixture of the various powers are present. If the $\omega$–$k$ curve C is lowered from the position shown, or if the wave is propagating at an angle to the bias field, then at some point the crossover region will involve coupling of electromagnetic and elastic power with little or no exchange power involved. A number of possible modes of energy and power may exist in the material as is quite evident from the discussion herein. It is not necessary for present purposes to delineate each of the possibilities, since the concern here is with the method by which transfers of energy and changes therein are made.

The preferred embodiment of the invention previously described herein contains an appropriately doped yttrium-iron-garnet rod as the material 1 within which the wave energy is propagated. This low-loss material is magnetostrictive and thus well suited for the practice of the invention since it will support a spin wave and each of the phase velocity and the group velocity of the spin wave can be varied by varying the environmental parameters in such a rod. The phase velocity is varied by changing the bias field $H_z$ in time and the group velocity is varied by varying the bias field $H_z$ in space, and, of course, both phase and group velocity can be varied concurrently. Environmental parameters as the term is used herein, denotes environmental parameters within the rod that may be changed to vary both the phase velocity and the group velocity of the propagating wave. Although the material discussed is magnetostrictive and its environmental parameters are varied by changing the bias field $H_z$, other materials may be used to obtain the novel results herein disclosed. For example, the material may be a semi-conductor supporting, for example, space-charge waves and elastic waves. The phase velocity and/or group velocity of an appropriate wave in the semiconductor can be changed by, for example, applying an electric bias field and varying the field in space and/or time in the manner disclosed. The material 1 may, on the other hand, be a ferro-, anti-ferro-, or ferrimagnet that is also a semiconductor. The phase velocity and/or group velocity of appropriate waves or admixtures of waves may be changed by applying an electric bias field and a magnetic bis field and varying them seprately or simultneously to effect changes of phase velocity and/or group velocity.

The characteristics of the crossover region previously discussed, are most often due to passive coupling, as, for example, the magnetoelastic coupling between two positive energy waves, as shown in FIGS. 3C and 3D; however, it should be noted that in the case of coupling between a "positive" energy wave and a "negative" energy wave, as coupling between a negative energy slow space-charge wave and a positive energy spin wave or positive energy elastic wave, the coupling can be active, and power can be transferred to the wave pulse by virtue of the coupling, independent of the time variation.

FIG. 5 discloses, schematically, apparatus that may be used to provide space-charge waves, spin waves and/or elastic waves in a material that is a semi-conductor but is also magnetostrictive and/or electrostrictive. A number of the elements shown have been numbered similarly to elements performing similar functions to the apparatus in FIGS. 1 and 2. The material in which energy conversion is to take place is shown in FIG. 5 as a rod 5, which may be made of cadmium-chromium-selenide ($CdCr_2Se_4$). The apparatus may be made to function similarly to the apparatus of FIGS. 1 and 2. Thus, an electromagnetic wave injected through the center conductor 6 may be removed by the conductor 6' after some time delay and may be converted to a spin wave and/or elastic wave in the manner previously described. Or the wave energy may be introduced as a small signal fast or slow space-charge wave associated with a beam of charge carriers having a mean velocity $V_o$, the fast space-charge wave (positive energy) being represented by the curve 64, and the slow space-charge (negative energy) wave being represented by the curve 63 in FIG. 6 in which is represented a situation where the majority carriers are electrons. The angle $\theta$ between the axis and the curves 63 and 64 may be increased or decreased by increasing or decreasing the voltage applied by a current pulser 10', to add to or subtract from the potential of a DC bias potential 3'. Thus conversion from space-charge wave energy to either spin wave or elastic energy (or vice versa) can be effected by changing the $\omega$-$k$ values of the space-charge wave in time or conversion may be effected by, for example, injecting magnon energy into the rod 5 at 60' in FIG. 6 and moving the $\omega$-$k$ curve of the spin wave to 61 and/or 62 and beyond, effecting some conversion to space-charge wave energy at 61' and 62'. The conversion at 61' is termed active and at 62' passive.

In the devices described in the foregoing the environmental parameters have been changed, thereby to vary the character of the wave energy. Thus, a force will accelerate or decelerate a wave packet whenever the appropriate environmental parameters (as $H_z$) is not uniform. It has been found for purposes of the present invention, however, that a similar effects occurs when the material parameters are spatially nonuniform. Although the DC field $H_z$ can be shaped and altered at will, it is subject to the constraints imposed by Maxwell's equations. But controlled gradients of the concentration of impurities used to dope a ferromagnetic crystal allows the creation of effective spatial fields free of such constraints along the path of travel of the propagating wave.

A further point is of interest in connection with the present disclosure. In a ferrimagnet in which two (or more) magentic sublattices are antiferromagnetically coupled, the sign of the effective masses of magnons in one branch is the converse of the sign in the other branch. The $\omega$-$k$ curves of the branches are therefore accelerated in opposite directions by a magnetic field gradient. The situation is especially interesting in the case of an antiferromagnet because the frequencies of magnons of both branches can be comparable to one another.

Modifications of the invention in addition to those herein disclosed, including, for example, control being effected through more than one pair of electrodes and using a material whose basic semi-conducting electrical properties may also be a function of position, will occur to those skilled in th art and all such modifications are considered to fall within the spirit and scope of the invention.

What is claimed is:

1. Apparatus for effecting temporal conversion of wave energy from one type to another that comprises, in combination, a material to receive the wave energy in the form of pulses, said material being one which supports at least one form of propagating wave energy in which at least one of the phase velocity and group velocity can be varied by varying the level of the environmental parameters in the material, said environmental parameters being either an internal quasistatic magnetic bias field or an internal quasistatic electric bias field, means for introducing the wave energy to the material, the wavelength of said propagating wave energy being short compared to the dimension of the material within which the energy is to propagate in the direction of propagation, means for controlling the level of the parameters to ensure that the wave energy appears as a propagating wave of which at least one of the phase velocity and group velocity can be controlled during at least a portion of the time that the wave is in the material, the control means being adapted to change the level of said parameters in time during the time during the time that the wave is in the material, the change being on a time scale that is long compared to the period of oscillation of the propagating wave energy.

2. Apparatus as claimed in claim 1 and in which said material is electrostrictive and said environmental parameters comprise an electric bias field.

3. Apparatus as claimed in claim 1 in which the means for introducing the wave energy to the material comprises a cavity, the material being located within the cavity, and a coaxial cable coupled to the cavity, the center conductor of the cable being secured in close proximity to one portion of the material to enable the introduction of electromagnetic wave energy to said one portion and the withdrawal of electromagnetic energy therefrom and in which acoustic transducer means is secured to another portion, the combination being adapted optionally to introduce electromagentic and acoustic energy to the material and to withdraw electromagnetic and acoustic energy from the material.

4. Apparatus as claimed in claim 1 and which said material is a magnetic semiconductor and said environmental parameters comprise an internal electric bias field and/or an internal magnetic bias field.

5. Apparatus as claimed in claim 4 in which said material is cadmium-chromium-selenide.

6. Apparatus as claimed in claim 1 and in which the material is magnetostrictive and the control means comprises magnetizing means adapted to apply to DC magnetic bias field to the material, the control means being further adapted to enable changes in the magnitude of the DC magnet field during said portion of time to effect changes in the wave energy at substantially constant $k$ and varying $\omega$.

7. Apparatus as claimed in claim 6 and in which the material comprises a rod, and the control means comprises a coil wrapped around the rod, a source of DC electric current connected to the coil, and a current pulser connected to effect changes in the level of current in the coil from one DC level to another DC level, the changes in the level of the current being timed by pulses from the delay means.

8. Apparatus as claimed in claim 7 and in which said wave energy is an electromagnetic wave, and an internal DC magnetic bias field is established at which at least some of the electromagnetic wave is converted to a spin wave, the DC magnetic bias field being thereafter pulsed from one DC level to another DC level to effect changes in the spin wave.

9. Apparatus as claimed in claim 1 and in which the said material is a ferrite medium and the environmental parameters comprise an internal magnetic field, said field containing a DC component, the control means being adapted to raise or lower the field from one DC level to another DC level thereby to effect changes in the wave energy at substantially constant $k$ and varying $\omega$.

10. A method of changing at least one of the character, frequency, power, pulse duration and delay time of pulsed wave energy that comprises, introducing the wave energy to a material having variable quasistatic equilibrium environmental parameters relative to passage of the wave energy therethrough, said environmental parameters being an internal quasistatic magnetic bias field or an internal quasistatic electric bias field or a combination thereof, said material being one which supports at least one form of propagating wave energy in which at least one of the phase velocity and group velocity can be varied by varying the level of said quasistatic equilibrium parameters, controlling the parameters during said passage to ensure that the wave energy appears as a propagating wave of which at least one of the phase velocity and group velocity can be varied during at least a portion of the time that the wave is in the material, and varying said parameters in time from one level to another level during the time that the wave is in the material, the changes in the parameters being on a time scale that is short compared to the transit time of the wave energy.

11. A method of effecting temporal conversion of wave energy from one type to another, that comprises, introducing the wave energy to a material having variable environmental parameters relative to passage of the wave energy therethrough, said material being one which supports at least one form of propagating wave energy in which at least one of the phase velocity and group velocity can be varied by varying the level of said parameters, said environmental parameters being an internal quasistatic magnetic bias field or an internal quasistatic electric bias field or a combination thereof, the wavelength of said propagating wave energy being short compared to the dimension of the material within which the energy is to propagate in the direction of propagation, controlling the level of the parameters during said passage to ensure that the wave energy appears as a propagating wave of which at least one of the phase velocity and group velocity can be varied during at laest a portion of the time that the wave is in the material, and varying the level of said parameters in time during the time that the wave is in the material, the change in parameters being on a time scale that is long compared to the period of oscillation of the propagating wave energy.

12. A method as claimed in claim 14 in which said conversion is between magnon and phonon wave energy and in which the varying in time of the bias field is effected at a time when the energy is in the magnon form, the varying being at substantially constant wave number ($k$) and variable angular frequency ($\omega$), and of an appropriate magnitude to pass the energy through the crossover region and at a rate appropriate to allow conversion of the wave from the magnon type to the phonon type thereof.

13. A method as claimed in claim 12 in which subsequent to conversion of the wave energy to the phonon type, the magnitude of the magnetic bias is varied to prevent reconversion to the magnon type of wave.

14. A method as claimed in claim 11 and in which said material is a semiconductor and said environmental parameters comprise an electric bias field within the material.

References Cited
UNITED STATES PATENTS

| | | | |
|---|---|---|---|
| 3,215,944 | 11/1965 | Matthews | 330—5.5 |
| 3,244,993 | 4/1966 | Schloemann | 330—5 |
| 3,249,882 | 5/1966 | Stern | 330—5 |
| 3,251,026 | 5/1966 | May et al. | 330—5.5 |
| 3,290,610 | 12/1966 | Auld et al. | 330—5.5 |
| 3,350,656 | 10/1967 | Vural | 330—5 |
| 3,366,896 | 1/1968 | Skudera et al. | 330—5.5 |
| 3,379,985 | 4/1968 | Matsuno | 330—5 |
| 3,164,768 | 1/1965 | Stiglitz et al. | 321—69 |
| 3,353,118 | 11/1967 | Olson et al. | 332—29 |
| 3,309,628 | 3/1967 | Olson | 330—30 |
| 3,445,774 | 5/1969 | Sparks et al. | 330—4.6 |

OTHER REFERENCES

Damon et al., "Applied Physics Letters," Apr. 15, 1965, pp. 152–154.

ROY LAKE, Primary Examiner

D. R. HOSTETTER, Assistant Examiner

U.S. Cl. X.R.

307—200; 321—69; 330—4.6, 5, 5.5; 333—30